March 27, 1945.  H. D. GEYER  2,372,483
FREEZING TRAY
Filed Feb. 10, 1937  2 Sheets-Sheet 1

Inventor
Harvey D. Geyer
By Spencer Hardman & Feber
his Attorneys

March 27, 1945.　　　　H. D. GEYER　　　　2,372,483
FREEZING TRAY
Filed Feb. 10, 1937　　　　2 Sheets-Sheet 2

Inventor
Harvey D. Geyer
By Spencer Hardman & Feber
his Attorneys

Patented Mar. 27, 1945

2,372,483

UNITED STATES PATENT OFFICE 2,372,483

FREEZING TRAY

Harvey D. Geyer, Dayton, Ohio, assignor to General Motors Corporation, Detroit, Mich., a corporation of Delaware Application February 10, 1937, Serial No. 125,025

7 Claims. (Cl. 62—108.5)

This invention relates to freezing trays and particularly such as may be used in household refrigerators for freezing small ice blocks for table use.

An object of this invention is to provide an improved metal grid for freezing trays having relatively movable partition walls for facilitating the removal of the frozen contents. A feature of the grid of this invention is its simplicity of design and hence economy of manufacture, and its high efficiency in facilitating ready removal of the frozen ice blocks.

A further object of the invention is to provide a very simple and economical method of permanently assembling the transverse walls of the grid unit to the longitudinal wall or walls thereof.

Further objects and advantages of the present invention will be apparent from the following description, reference being had to the accompanying drawings wherein a preferred embodiment of the present invention is clearly shown.

In the drawings.

Similar reference characters refer to similar parts throughout the several views.

Figure 1:
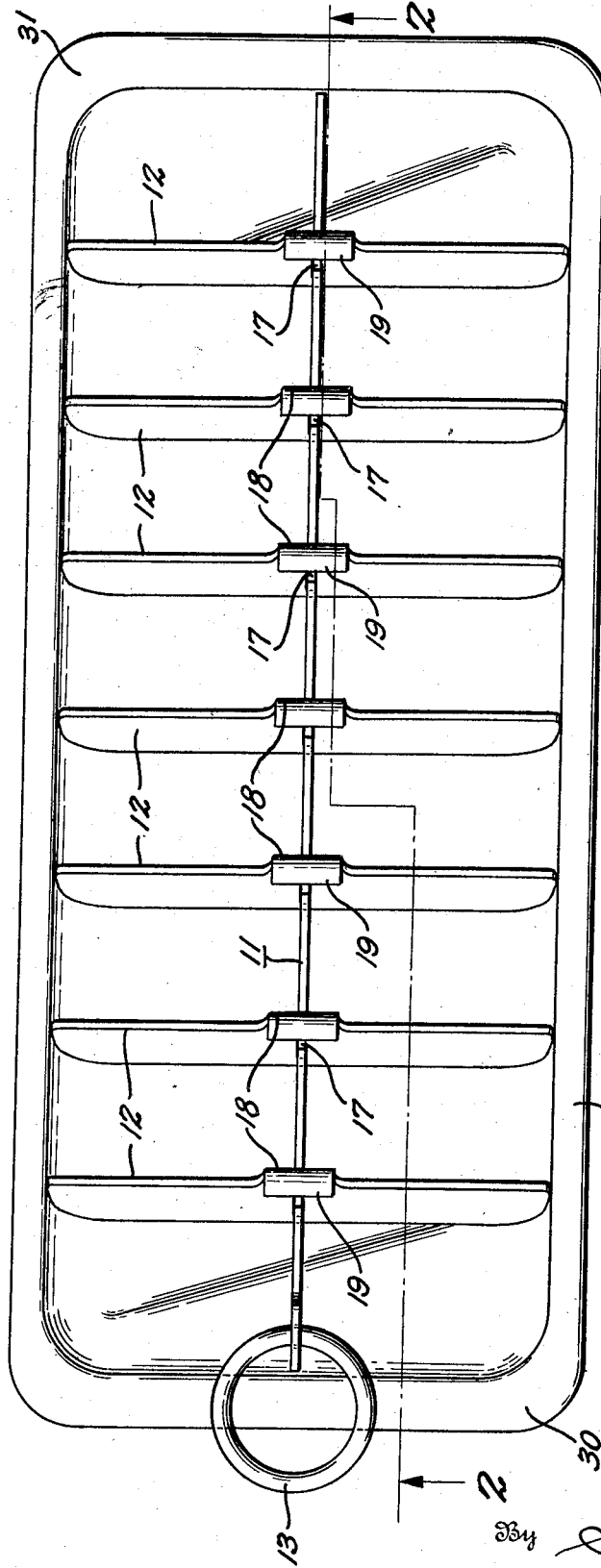
Fig. 1 is a plan view of an ice tray with the grid made according to this invention inserted therein in freezing position.

Referring to the drawings, 10 designates a one-piece pressed metal pan which may be of any known type, or it may be of non-metallic material such as flexible rubber if desired. However I prefer to use with the grid of this invention a slightly flexible metal pan which may be slightly flexed when filled with its frozen contents to first free the grid and its frozen contents as a block from the pan. Such a flexible metal pan is disclosed and claimed in my copending application S. N. 88,559 filed July 2, 1936, Patent No. 2,122,937 issued July 5, 1938.

The grid comprises a longitudinal metal partition wall 11 and a series of transverse metal walls 12 each retained loosely upon said center wall 11 so as to be capable of a slight tilting movement relative thereto, as will be clear from the drawings. Transverse walls 12 are preferably retained in a slanted position as illustrated, however this is not necessary and their normal position may be vertical or slanted in the opposite direction from that illustrated.

Figure 6:
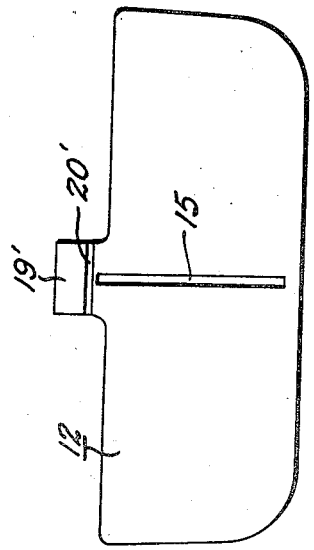
Fig. 6 is a face view of one of the transverse walls ready to be threaded upon the longitudinal wall and prior to having its interlocking projection folded down to in effect reduce the depth of the central slot therein.
Figure 5:
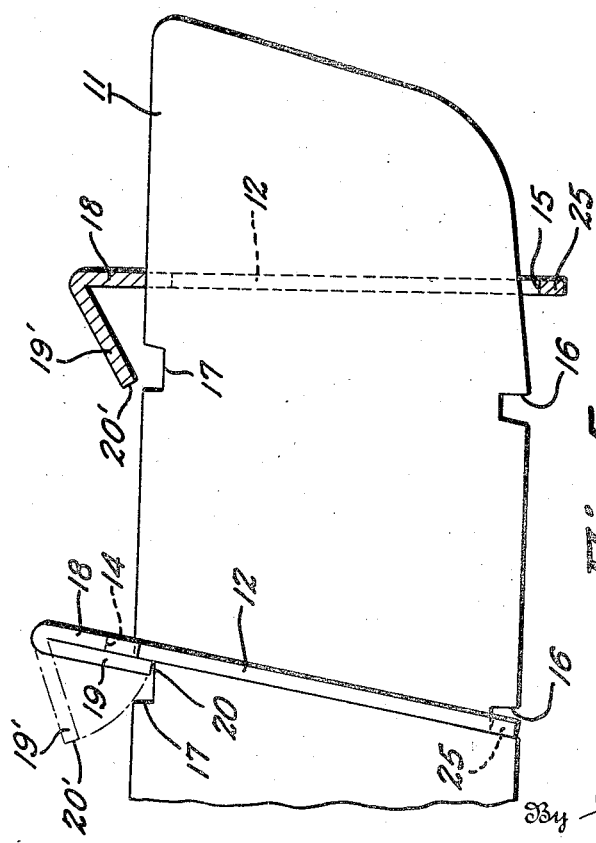
Fig. 5 illustrates the preferred structure and method of assembling the transverse walls to the longitudinal wall.
Figure 3:
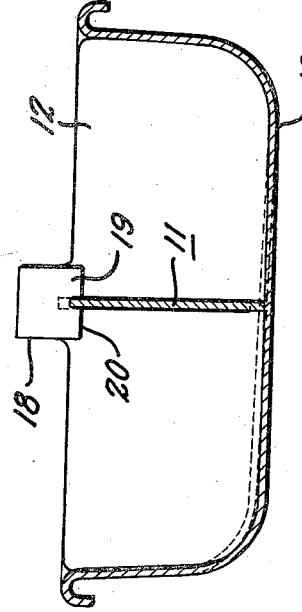
Fig. 3 is a section on line 3—3 of Fig. 2.

The preferred method of making the grid will now be described. The center wall 11 is provided with notches 16 on its lower edge and somewhat wider opposed notches 17 on its upper edge (see Fig. 5), and shaped in outline to fit loosely in pan 10 to form a central partition wall. Each transverse wall 12 is first formed as shown in Fig. 6, having a punched out central slot 15 therein which has such depth that the central wall 11 may be threaded thru slots 15, as illustrated on the right side of Fig. 5. Each transverse wall 12 also has an integral upward projection 18 and a bent portion 19' turned down at such an angle that its lower edge 20' will still not interfere with the passage of central wall 11 through slot 15. Obviously this permits each of the transverse walls 12 to be slipped over the end of central wall 11 and be passed therealong to its desired position.

To permanently assemble each transverse wall 12 upon the central wall 11, each wall 12 is passed along wall 11 until it registers with its particular lower notch 16, whereupon the wall 12 is raised upwardly causing its lower marginal portion 25 to enter and be retained in the notch 16. After such raising of wall 12 the upper boundary of slot 15 will lie at 14 and the bent portion 19' will lie in the dotted position shown in Fig. 5 (see left side of Fig. 5). The bent portion 19' may then be bent down to its final position 19, and thereby permanently retain wall 12 loosely in the two notches 17 and 16, as will be clear from the drawings. When thus finally assembled upon the central wall 11 each of the transverse walls 12 may be individually tilted relative thereto a slight amount. Also each wall 12 may be bodily moved longitudinally of wall 11 a slight amount due to the excess width of the lower notches 16, as will be clear from Fig. 5. Wall 11 preferably has a loose ring 13, or other suitable handle attached thereto, whereby the grid may be more readily lifted from the pan 10 when filled with its frozen contents.

Figure 2:
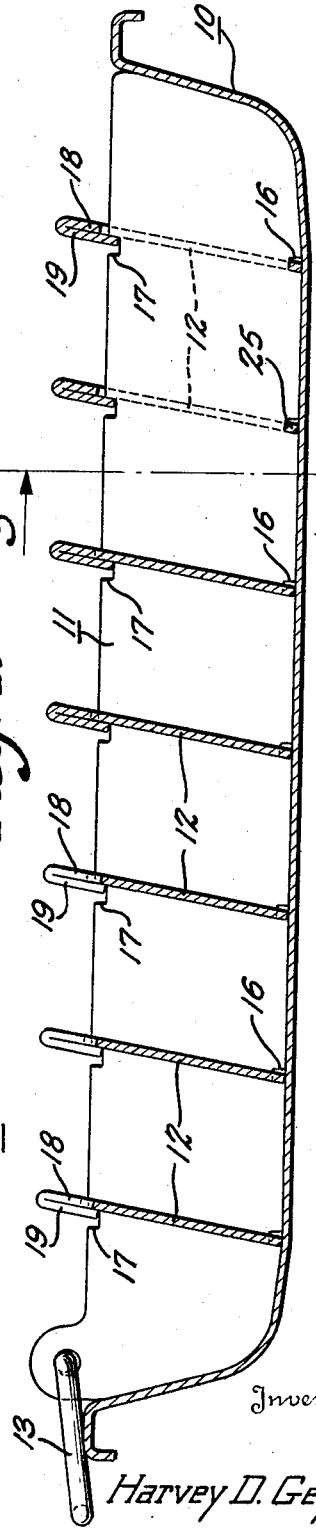
Fig. 2 is a section on line 2—2 of Fig. 1.

In operation, the grid unit is simply set within pan 10, either before or after pan 10 is filled with the water to be frozen. All of the transverse walls 12 will tilt over by gravity and each will engage the similar end of its notch 17, so that when walls 12 are in their normal freezing position they will all be tilted at the same angle as best shown in Fig. 2. Furthermore they will all be urged to lie substantially perpendicular to the center wall 11 even though their loose fit may permit walls 12 to swing at a substantial angle to wall 11 as seen in top view. Such urging of the walls 12 to a parallel position (as seen in Fig. 1) is caused by their normal tilted position relative to the vertical and the engagement of the bottom edges of walls 12 with the bottom of pan 10. In other words, if any one tilted wall 12 should lie at an angle to center wall 11 (as seen in top view), one end of such wall 12 will necessarily lie below the other end thereof, and hence when this lower end of wall 12 engages the pan bottom it will be cammed back to its normal position at which its lower edge extends horizontally, as shown in Fig. 1. Hence Fig. 1 shows the only position of the walls 12 when the lower edges of these walls 12 lie in substantial uniform contact with the pan bottom. Therefore the grid unit may be inserted carelessly into the pan and then be given a shake or two, whereupon all the walls 12 will arrange themselves in their correct freezing position shown in Figs. 1 and 2.

To remove the ice blocks after being solidly frozen, the grid and its ice contents are first removed from the pan 10 in any known manner, which may be by slightly flexing pan 10 by downward hand pressure on its two diagonally opposed corners 30 and 31 as described in my said prior application S. N. 88,559.

Figure 4:
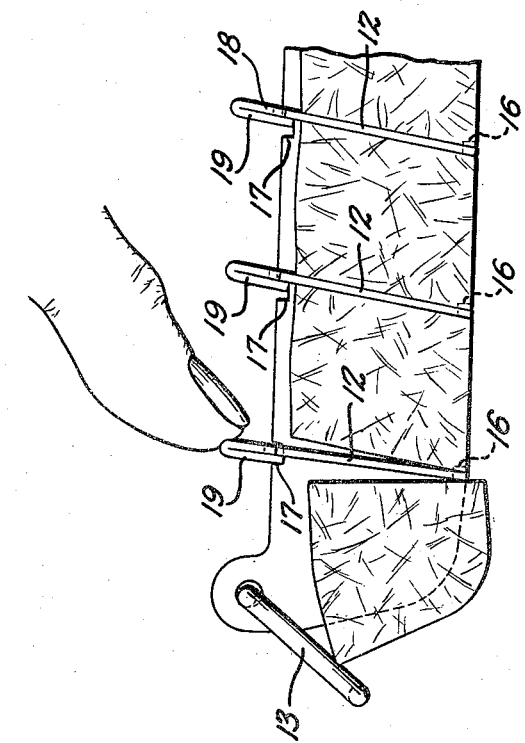
Fig. 4 illustrates a method of removing the frozen ice blocks from the grid after its removal from the pan by thumb pressure against the upper portion of each transverse wall.

The first transverse wall 12 may then be tilted forward with the thumb (as shown in Fig. 4) to release the first two ice blocks, leaving the remainder undisturbed. When more ice blocks are wanted, the other walls 12 may each be tilted forward, one after the other, until all the ice blocks are released.

Obviously if desired, a suitable hand tool may be used instead of the fingers to engage the projections 18 and tilt walls 12 forward one after the other. Or a suitable mechanism attached to the grid, including a longitudinally movable actuating bar or link extending along the top edge of center wall 11, may be employed to tilt walls 12 forward successively to release successive pairs of ice blocks as described above. Preferably all metal surfaces which are frozen-bonded to the ice are coated with a thin film of hard wax to materially facilitate the operation of the device.

While the embodiment of the present invention as herein disclosed, constitutes a preferred form, it is to be understood that other forms might be adopted, all coming within the scope of the claims which follow.

What is claimed is as follows:

1. A freezing device having a container for the liquid to be frozen and a removable partitioning grid insertable within said container, said grid comprising: a main wall having a plurality of notches in both the upper and lower edges thereof, and a series of transverse walls each loosely retained upon said main wall by a loose fit within an upper and a lower notch of said main wall, said transverse walls each having a pressure portion projecting above said main wall against which pressure may be readily exerted to tilt the transverse wall relative to said main wall.

2. A freezing device having a container for the liquid to be frozen and a removable partitioning grid insertable within said container, said grid comprising: a main wall having a plurality of notches in both the upper and lower edges thereof, and a series of transverse walls each loosely retained upon said main wall by a loose fit within an upper and a lower notch of said main wall, said upper notches permitting a greater movement of said transverse walls relative to said main wall than is permitted by said lower notches.

3. A freezing tray having a partitioning grid, said grid comprising: a metal wall having a notch in both its upper and lower edges, a transverse metal wall having a closed slot therein through which said first metal wall is inserted until the lower portion of said transverse wall is received in said lower notch, said transverse wall having an upper portion which is deformed into engagement with said upper notch and so retained therein, whereby said transverse wall is held permanently retained in said upper and lower notches in said first wall.

4. A unitary metallic grid structure for disposition in a freezing tray and removable therefrom as a unit, said grid structure comprising a substantially inflexible main wall having a plurality of notches in both the upper and lower edges thereof, and a series of substantially inflexible walls extending transversely of said main wall each loosely retained upon said main wall by a loose fit within an upper and a lower notch of said main wall, said upper and lower notches permitting angular movement of said transverse walls relative to said main wall, said upper notches permitting a greater movement of said transverse walls than is permitted by said lower notches.

5. A unitary grid structure for disposition in a freezing tray and removable therefrom as a unit, said grid structure comprising a normally stationary main wall and a series of movable cross walls extending across said main wall and forming two rows of ice block compartments when disposed within said tray, said cross walls being loosely supported upon and having a relative swinging connection with said main wall in such manner that when the grid is set directly upon the bottom wall of said tray said cross walls will engage to be lifted by said bottom wall and then be inclined by gravity into their normal freezing positions of predetermined inclinations relative to the bottom wall of said tray, said inclined cross walls being manually tiltable to a more upright position after the tray contents are frozen solid to facilitate the removal of the ice blocks.

6. A unitary grid structure for disposition in a freezing tray and removable therefrom as a unit, said grid structure comprising a main wall having a series of cross-wall-retaining openings therein spaced along its length and a series of cross walls loosely retained in said openings, said cross walls extending below said main wall so that said cross walls will be tilted by gravity to an inclined position when they are engaged and lifted by the bottom wall of said tray when said grid rests thereupon, said cross walls being arranged to be manually tilted one after the other from this inclined normal freezing position to more upright positions after the tray contents are frozen to loosen the ice blocks from their frozen bond to said grid structure.

7. A unitary grid structure for disposition in a freezing tray and removable therefrom as a unit, said grid structure comprising a normally stationary main wall and a series of normally inclined cross walls loosely retained upon said main wall in longitudinally spaced relation therealong, said cross walls having a limited swinging connection with said main wall and so arranged as to be urged by gravity into a predetermined inclined freezing position when the freezing tray is set in its normal freezing position, said cross walls having pressure portions extending above said main wall and adapted to be engaged by the thumb of the operator whereby said cross walls may be forced to a more upright position after the tray contents are frozen to facilitate the removal of the frozen contents.

HARVEY D. GEYER.